Aug. 10, 1954     G. J. WILKINSON     2,685,741
ALIGNING INSTRUMENT FOR USE IN LAYING BRICKS
Filed June 9, 1952     2 Sheets-Sheet 1
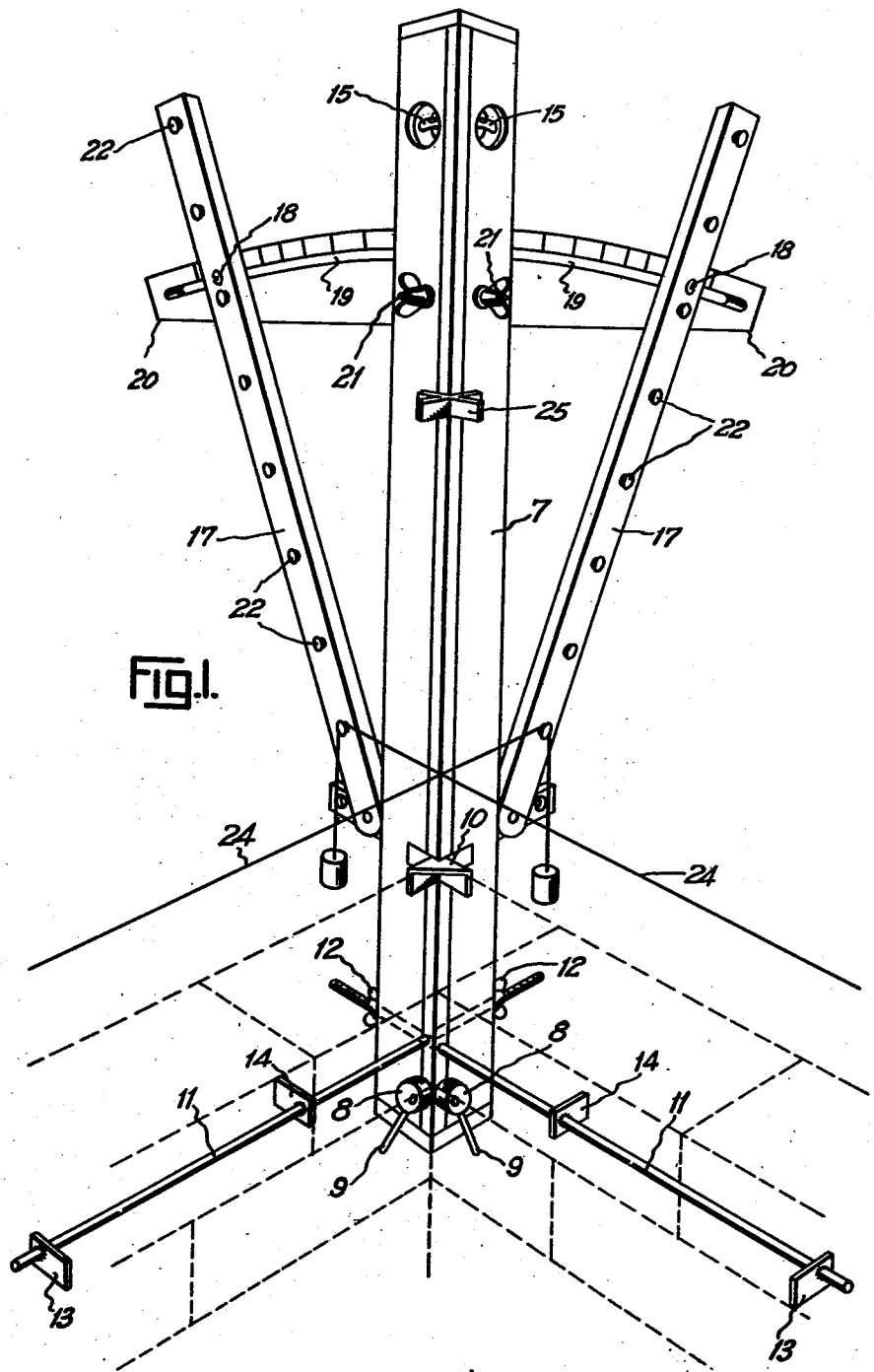

Aug. 10, 1954  G. J. WILKINSON  2,685,741
ALIGNING INSTRUMENT FOR USE IN LAYING BRICKS
Filed June 9, 1952  2 Sheets-Sheet 2
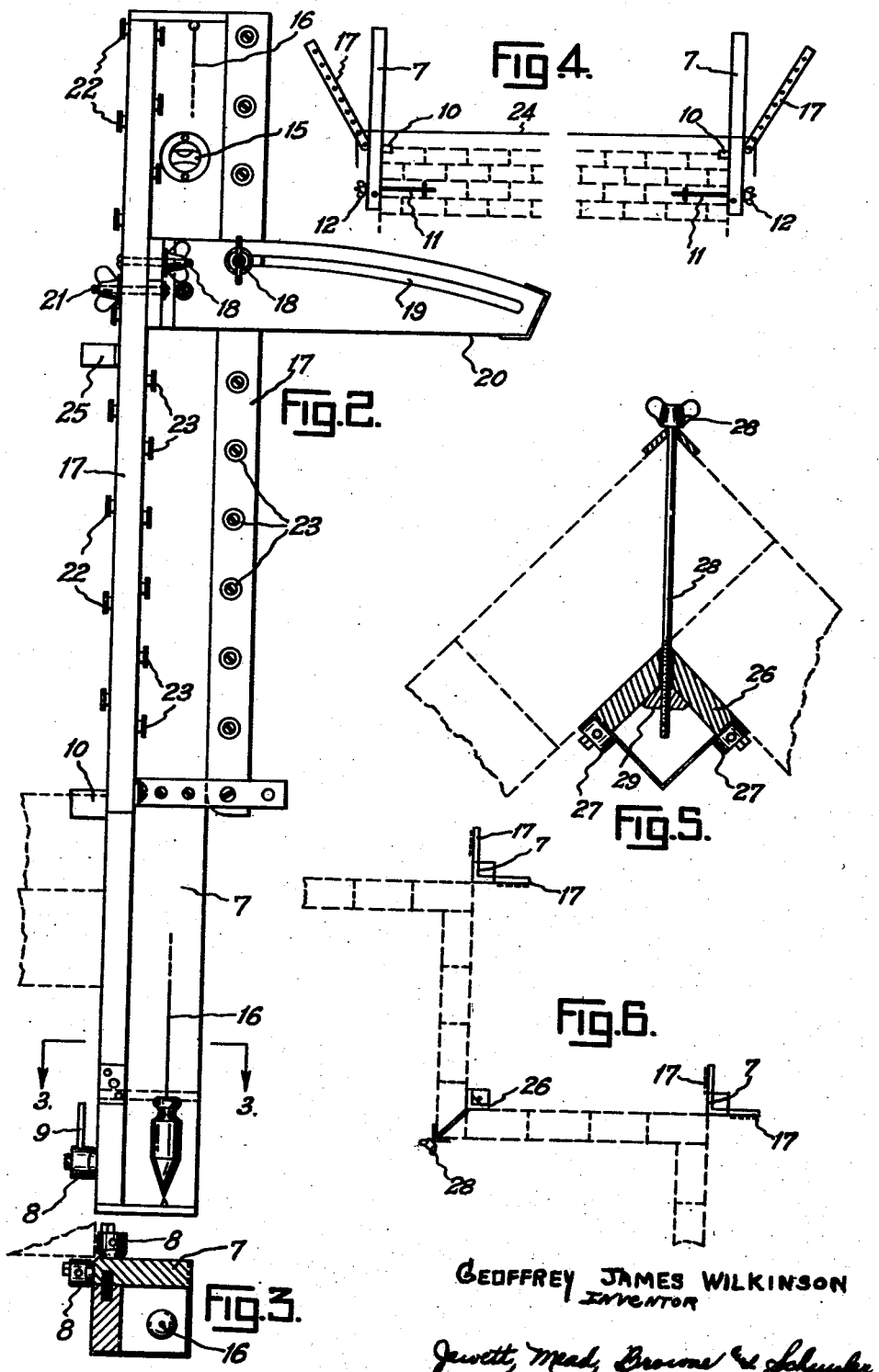
Geoffrey James Wilkinson
INVENTOR

Patented Aug. 10, 1954

2,685,741

UNITED STATES PATENT OFFICE 2,685,741

ALIGNING INSTRUMENT FOR USE IN
LAYING BRICKS

Geoffrey James Wilkinson, Carlton, near Sydney,
New South Wales, Australia

Application June 9, 1952, Serial No. 292,428

Claims priority, application Australia
June 14, 1951

6 Claims. (Cl. 33—85)

The object of this invention is to provide an aligning instrument whereby bricklaying may be carried out more rapidly and more accurately than is the case with existing bricklaying practice. By existing bricklaying practice gauging for accuracy is effected by erecting guide brickwork at the building or wall corners; or, in the case of a long wall, "dead man" piers at selected intervals between corners, and then "filling in" between the initially erected guide brickwork with the aid of a levelling line pegged between the courses of the guide brickwork. The filling in is a relatively simple task, but in the initial erection of the guide brickwork (which although usually erected in a piecemeal manner, extends for the full height of the wall) considerable loss of time occurs because each of the bricks has to be checked and adjusted for level in two directions and for correct height and disposition so that it will be truly in position to act as a gauging member when filling in.

In view of the foregoing the object of this invention may be re-stated as consisting in the provision of an aligning instrument whereby guide brickwork is unnecessary (as such) and the corner or other formerly critical portions may be laid as easily as, and with no greater skill on the part of the operator than is required for, simple filling in.

The invention mainly consists in an aligning instrument for use in laying bricks, comprising, a stock, means for fixing the stock uprightly at the corner of a partly built brick wall, a line supporting arm which has a row of regularly spaced line carriers thereon and which is pivotally connected to the stock, and means for holding the arm in selected angular disposition relative to the stock.

An example of the invention is shown in the drawings herewith.

Figure 1 is a perspective view of the instrument as applied to a partly built brick wall (shown by dotted lines).

Figure 2 is a side elevation of the instrument.

Figure 3 is a sectional plan taken on line 3—3 in Figure 2.

Figure 4 is a side elevation (on a reduced scale) showing two of the instruments applied to a partly built brick wall (shown by dotted lines).

Figure 5 is a sectional plan of a line deflector, applicable to internal corners of walls, for use with a pair of the instruments subject hereof.

Figure 6 is a plan of the deflector shown in Figure 5 (on a reduced scale) as used in combination with a pair of the instruments.

In the illustrated preferred embodiment of the invention, 7 indicates the stock. It is preferably of angle section as shown, but may be of rectangular or other cross-sectional shape. Adjacent what in use is its lower end, the stock has a pair of adjustment stops thereon. These stops may be small angle brackets having set screws threaded through them and so directed that the set screws may be set against the brickwork with which the instrument is being used; for preference however the adjustment stops consist of two eccentrics 8 which are rotatably mounted on the stock and which are furnished with turning handles 9.

A corner bracket 10 is fixed on the stock above the eccentrics 8; and between the corner bracket and the eccentric stops the stock has two drillings at right angles to receive the shanks of a pair of clamping bolts 11. These bolts have threaded ends for nuts 12, and each is furnished with an abutment plate 13 able to enter the space between the ends of two previously laid bricks. Each bolt may have extra and oppositely directed abutment plates 14 for engaging brick ends "half a brick" nearer to the wall corner than those engageable by the plates 13.

The stock may be fitted with a pair of spirit level tubes 15 and, additionally or alternatively, with a plumb line 16. While these trueing aids are preferably incorporated, they are not essentially so, because the stock may be correctly positioned by use of ordinary and separate spirit level devices or other trueing aids.

The stock 7 has a pair of line supporting arms 17 pivotally mounted thereon so that they may be swung away from the stock, and away from the brickwork in two directions at right angles. The arms 17 are retained in selected angular adjustment by bolts 18 in arcuate slots 19 in support plates 20 fixed to the stock permanently, or removably as by bolts 21 for ready dismantling to give carriage convenience.

The arms 17 are provided with line carrier elements which, in the illustrated embodiment, are headed studs 22. The line carriers are regularly spaced apart at a pitch approximately equal to maximum brick depth plus the maximum mortar depth likely to be used in common bricklaying practice. Additional and differently spaced line carriers 23 may be provided for use when building with differently sized bricks. When the carriers 23 are to be used, the arms 17 are removed from the stock 7 and the support plates 20, and replaced reversed so that the carriers 23 face outwardly as do all the carriers 22 as illustrated in the drawings. Although the line carriers are preferably headed studs (as shown) they may consist of unheaded pegs or even lateral saw cuts in the arms 17.

The slotted support plates 20 may be calibrated in terms of brick depths, so to facilitate setting of the line supporting arms having regard to the average depth of the bricks to be laid.

When a brick structure is to be erected the average depth of the bricks is first ascertained and the two line supporting arms may then be adjusted so that the vertical distance between the line carriers 22 (or 23) corresponds with the brick average thickness plus the mortar average thickness. There are preferably at least four gauge instruments of the kind subject hereof used in the erection of an ordinary rectangular brick structure, one for each corner of the structure. At least two such instruments would preferably be used (as shown in Figure 4) for building an ordinary wall, although with somewhat less efficiency one instrument of the kind subject hereof could be used for supporting one end of a gauge line whereof the other end would be pegged to the existing brickwork in accordance with usual practice.

At the corner at which one of the instruments is to be used the first three or four bricks from the foundation, being invariably concealed, may be erected by conventional practice and without a particularly high standard of accuracy. The corner bracket 10 is then emplaced upon the topmost corner brick and the bolts 11 are engaged with two of the pre-laid bricks and their nuts 12 preliminarily tightened. The stops 8 are then adjusted while the nuts 12 are further tightened or adjusted until such time as the instrument stock is disposed accurately upright as shown by its spirit levels and/or plumb bob, at the same time the instrument is securely attached to the existing brickwork by tightening the nuts 12. In the preferred practising of the invention this operation is performed at at least two corners of the structure and an instrument according hereto applied to each of said corners. A gauge line or cord (24) is then hung about the carriers 22 (or 23) at each end of the span to be bricked and bricks may then be laid for the entire length of the wall without preliminary guide brickwork.

The instrument may be made of any selected height but it is considered that a height sufficient to enable eight courses of bricks to be laid for each setting of the instrument will be convenient for most bricklaying operations. In this connection it will be apparent that the loading effect due to the sideward pull of the lines 24 will be greatest when the upper carriers 22 are in use. Because of this it is desirable to provide the stock with a steadying rest 25 able to engage the brickwork corner when the line is used at or near the top of the arms 17.

The instrument structure as herein described may be varied in several respects without departure from the essence of the invention. For example, the line supporting arms may each be made in two parts hinged together, one part being hinged to the stock as previously described and the other part hinged to a bolt or a runner bracket or the like which is vertically adjustable relative to the stock and adapted for adjusted affixture thereto by bolts or the like extending through longitudinal slots in the stock; or by a bolt or bolts which are fixed to the stock and extend through elongated holes in the runner bracket. By this arrangement the two-part arm is adjusted in the manner of the two arms of a toggle lever. As a further alternative, the eccentrics may be dispensed with and replaced by wedges or other packings.

Although the instrument preferably has two arms such as 17, it will be seen that if it had only one such arm it could still be usefully employed.

To enable instruments of the kind subject hereof to be employed when building "internal" corners, a line deflector as shown in Figures 5 and 6 may be employed. This deflector comprises a stock 26 which is similar to the stock 7 insofar as it may be equipped with levels such as 15, plumb line such as 16, and adjustment stops (27) similar to those marked 8 in Figures 1 to 3. The deflector is secured in position by bolts 28 engaging nuts 29. The deflector has no line supporting arms (such as 17) the line being merely passed tautly about its stock 26 and levelled by measurement, use of a line level or otherwise.

I claim:

1. An aligning instrument for use in laying bricks, comprising, a stock having a corner edge extending straightly for the full length of said stock, means for fixing said stock uprightly to and at the corner of a partly built brick wall with said corner edge coincident with said wall corner, a line supporting arm which is pivotally mounted on said stock for angular movability within the plane of one flat surface of said wall, a plurality of equally and fixedly spaced line carriers on said arm, and means for holding said arm in selected angular disposition relative to said corner edge.

2. An aligning instrument for use in laying bricks, comprising, a stock having a corner edge extending straightly for the full length of said stock, means for fixing said stock uprightly to and at the corner of a partly built brick wall with said corner edge coincident with said wall corner, a pair of adjustment stops on said stock which are able to bear against said wall and which enable independent adjustment of said stock in two directions at right angles, a pair of line supporting arms which are pivotally mounted on said stock for respective angular movability within the planes of the two flat wall surfaces which meet in said wall corner, a plurality of equally and fixedly spaced line carriers on each of said arms, and means for holding each of said arms in selected angular disposition relative to said corner edge.

3. An instrument according to claim 2 wherein said fixing means comprise, a corner bracket on said stock, and two clamping bolts mounted on said stock each at right angles to the other and each having at least one brick-engageable abutment plate thereon.

4. An instrument according to claim 2 wherein each of said stops consists of an eccentric rotatably mounted on said stock.

5. An instrument according to claim 2 wherein the said arm holding means comprise, for each arm, an arcuately slotted support plate secured to said stock, and a bolt which is fixed to the arm and extends through the slot in said support plate.

6. The combination with a pair of instruments each according to claim 2, of a line deflector comprising a stock having a corner edge extending straightly for the full length of said stock, and means for fixing said stock uprightly to and within an internal corner of a partly built brick wall with its corner edge coincident with said internal corner.

References Cited in the file of this patent
UNITED STATES PATENTS

| Number | Name | Date |
| --- | --- | --- |
| 420,880 | Lambdin | Feb. 4, 1890 |
| 1,336,004 | Victoria | Apr. 6, 1920 |
| 2,615,253 | Weathers | Oct. 28, 1952 |

FOREIGN PATENTS

| Number | Country | Date |
| --- | --- | --- |
| 603,796 | Great Britain | June 23, 1948 |